US008652994B2

(12) United States Patent
Li et al.

(10) Patent No.: US 8,652,994 B2
(45) Date of Patent: Feb. 18, 2014

(54) SUPPORTED NOBLE METAL CATALYST AND PROCESS FOR PREPARING THE SAME IN SITU

(75) Inventors: Dianqing Li, Beijing (CN); Junting Feng, Beijing (CN); Xiaoyan Ma, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 13/700,427

(22) PCT Filed: May 27, 2010

(86) PCT No.: PCT/CN2010/073306
§ 371 (c)(1),
(2), (4) Date: Feb. 7, 2013

(87) PCT Pub. No.: WO2011/147090
PCT Pub. Date: Dec. 1, 2011

(65) Prior Publication Data
US 2013/0143731 A1 Jun. 6, 2013

(51) Int. Cl.
*B01J 23/38* (2006.01)
*B01J 23/40* (2006.01)
*B01J 27/236* (2006.01)

(52) U.S. Cl.
USPC ............................ 502/339; 502/176; 502/325

(58) Field of Classification Search
USPC .......................................... 502/176, 325, 339
IPC ................................ B01J 23/38,23/40, 27/236
See application file for complete search history.

(56) References Cited

U.S. PATENT DOCUMENTS

| 4,902,660 | A | 2/1990 | Delzer et al. | |
|---|---|---|---|---|
| 7,108,804 | B2* | 9/2006 | Lu et al. | 252/373 |
| 2008/0187468 | A1* | 8/2008 | Bowe et al. | 422/211 |
| 2011/0237430 | A1* | 9/2011 | Zhang et al. | 502/327 |

FOREIGN PATENT DOCUMENTS

| CN | 1483512 A | 3/2004 |
|---|---|---|
| CN | 101402039 A | 4/2009 |

OTHER PUBLICATIONS

Zhao (synthesis, Chracterization and appolication of hydrotalcties in hydrogesulfurization of FCC gasoline, Fuel processcing Technology, 2003: 81, 201-209).*
International Search Report for PCT/CN2010/073306, mailed Mar. 10, 2011, 3 pages.
Written Opinion of the International Searching Authority for PCT/CN2010/073306, mailed Mar. 10, 2011, 5 pages.

(Continued)

*Primary Examiner* — Jun Li
(74) *Attorney, Agent, or Firm* — Schwabe, Williamson & Wyatt, P.C.

(57) ABSTRACT

A process for preparing supported noble metal catalyst in situ is provided by mixing and crystallizing hexamethylenetetramine, soluble divalent metal salts solution, Al2O3 carriers and soluble noble metal salts solution wherein the hexamethylenetetramine is used as a precipitating agent for preparing hydrotalcite and a reducing agent of noble metal precursor. During the growth process of hydrotalcite, Al3+ on the Al2O3 carrier's surface is directly used as the trivalent metal ions in the laminate structure and the hydrotalcite is obtained on the surface of the Al2O3 carriers by in-situ growth. A supported catalyst Me-LDHs-Al2O3 containing an elementary noble metal is produced wherein the noble metal element particle in the catalyst has a particle size of 10 to 60 nm, and is evenly and stably dispersed on or between slabs of the hydrotalcite.

5 Claims, 3 Drawing Sheets

(56) References Cited

OTHER PUBLICATIONS

International Preliminary Report on Patentability for PCT/CN2010/073306, mailed Nov. 27, 2012, 6 pages.

Panpranot, J. et al., "Effects of Pd precursors on the catalytic activity and deactivation of silica-supported Pd catalysts in liquid phase hydrogenation," Applied Catalysis A: General 292:322-327, 2005.

Francova, D. et al., "Hydrogenation of 2-butyne-1, 4-diol on supported Pd catalysts obtained from LDH precursors," Microporous and Mesoporous Materials 99:118-125, 2007.

Chinayon, S. et al., "Selective hydrogenation of acetylene over Pd catalysts supported on nanocrystalline a-Al2O3 and Zn-modified a-Al2O3," Catalysis Communications 9: 2297-2302, 2008.

\* cited by examiner

SUPPORTED NOBLE METAL CATALYST AND PROCESS FOR PREPARING THE SAME IN SITU

FIELD OF THE INVENTION

The invention relates to a supported noble metal catalyst and a process for preparing the same in situ, in particular to a noble metal catalyst with alumina as a carrier produced by an in situ process, and its preparation process. The catalyst may be applied in various reactions in the fields of petrochemical industry, organic chemistry or the like.

BACKGROUND OF THE INVENTION

Platinum group elements include noble metal elements such as ruthenium, rhodium, palladium, osmium, iridium and platinum, in which the elements ruthenium (Ru), rhodium (Rh), palladium (Pd) and platinum (Pt) have an excellent catalytic performance, and have been widely used in the petrochemical industry and various reactions in organic chemistry and are excellent catalysts or one of the important components of the catalysts. However, when the noble metal catalyst is prepared using a conventional impregnation method, under the influence of the surface tension of the impregnating solution and the solvation effect in the drying stage, the precursor of the noble metal active component is deposited on the surface of the carrier in the form of aggregates; such a high degree of aggregation is difficult to break down in the subsequent calcination process, which seriously affects the dispersion degree and catalytic activity of the active component. Additionally, when the supported metal catalyst is prepared using a conventional impregnation method, calcination and reduction processes must be carried out to obtain a zero-valent noble metal catalyst having catalytic activity, and the preparation process is therefore complicated.

Hydrotalcite is a type of anionic layered compound, a member of a class of materials also known as layered double hydroxides, abbreviated as LDHs. It has characteristics such as a regular arrangement of the interlayer anions and the chemical composition of slabs, a weak alkalinity, and good thermal stability, and can be used as a carrier for a noble metal catalyst. The composite metal oxide produced by calcination of a hydrotalcite precursor has a high specific surface area and good thermal stability, and a noble metal catalyst having a high degree of dispersion with the composite metal oxide as the carrier can be obtained by subjecting the hydrotalcite-supported active component to calcination and reduction. However, the aforementioned catalysts prepared by conventional methods such as impregnation must go through the steps of calcination and reduction before a form of the noble metal element having catalytic activity can be obtained.

Alumina has characteristics such as a large specific surface area, good thermal stability, high mechanical strength, an adjustable surface acidity and a low price, and has been widely used in the fields of petrochemical industry and catalysis. Currently, the catalyst carrier used in hydrogenation processes is generally alumina in both China and elsewhere. In terms of the geometric shape, alumina carriers can be divided into spherical, bars, cylindrical, trefoil, honeycomb shape and the like. Compared with the others, spherical carrier particles, which are in contact with each other at points in a fixed bed, bear stress evenly, easily give a filling of a dense phase, and are not prone to channeling, offer improved mass transfer and catalytic performance, and have become a focus of research in recent years.

In Document [1] Effects of Pd precursors on the catalytic activity and deactivation of silica-supported Pd catalysts in liquid Phase hydrogenation, *Applied Catalysis A*, 2005, 292: 322-327, catalysts with $SiO_2$/MCM-41 as the carrier are prepared using different Pd precursors, $Pd(NO_3)_2$, $PdCl_2$ and $Pd(OOCCH_3)_2$ by the impregnation method, and the experimental results show that the Pd particles in the prepared catalysts have a small size, a high degree of dispersion, and a high catalytic activity in liquid-phase hydrogenation reactions. However, after five cycles of reactions, the active ingredient—Pd particles—become severely sintered, and their catalytic activity is decreased significantly.

In Document [2] Hydrogenation of 2-butyne-1,4-diol on supported Pd catalysts obtained from LDH precursors, *Microporous and Mesoporous Materials*, 2007, 99:118-125, Pd catalysts are prepared using hydrotalcite as the precursor by the impregnation method, coprecipitation method, and ion-exchange method, and the test results show that the catalysts prepared by these three methods have a large specific surface area, a high degree of dispersion of the active ingredient, and a good catalytic activity and a good selectivity. However, similarly to the case for other supported metal catalysts, calcination and reduction steps must be carried out to obtain $Pd^0$ having catalytic activity, and the preparation process is complicated.

In Document [3] Selective hydrogenation of acetylene over Pd catalysts supported on nanocrystalline $\alpha$-$Al_2O_3$ and Zn-modified $\alpha$-$Al_2O_3$, *Catalysis Communications*, 2008, 9:2297-2302, Pd—$Al_2O_3$ catalysts are prepared using $Al_2O_3$ as the carrier by the sol-gel method and the solvothermal method respectively, and the characterization results demonstrate that the metallic Pd in the catalysts has a large particle size and a low degree of dispersion.

In summary, the preparation methods currently used for supported noble metal catalysts are complicated, and calcination and reduction steps are required after the noble metal has been supported; during the calcination, the particles of the active noble metal component easily become sintered, which has a serious adverse effect on the catalytic activity. Therefore, the development a noble metal catalyst produced by a simple preparation method, having a large specific surface area of the carrier, a high degree of dispersion of the metal and a high utilization ratio of the active component, a good catalytic activity and a good selectivity has become an important target.

SUMMARY OF THE INVENTION

The object of the invention is to provide a noble metal catalyst supported on alumina as the carrier.

Another object of the invention is to provide a process for preparing a noble metal catalyst supported on alumina as the carrier.

The invention provides a noble metal catalyst supported on alumina as the carrier, which may be represented by:

$$\text{Me-LDHs-Al}_2\text{O}_3 \qquad (I)$$

In the formula (I), Me is a noble metal as the active component of the catalyst, and Me is Ru, Rh, Pd or Pt; the noble metal element particle in the catalyst has a particle size of 10 to 60 nm, and has an even and stable dispersion on or between slabs of hydrotalcite; and the hydrotalcite is grown in situ on the surface of the alumina carrier by taking advantage of Al element in the alumina.

In the formula (I), the LDHs is hydrotalcite having a chemical composition formula of $[M^{2+}_{1-x}Al^{3+}_x(OH)_2]^{x+}(A^{n-})_{x/n} \cdot mH_2O$, wherein $M^{2+}$ is a divalent metal ion positioned on the main slabs, and $M^{2+}$ is one or more of $Mg^{2+}$, $Zn^{2+}$, $Ni^{2+}$, $Co^{2+}$, $Cu^{2+}$ and $Mn^{2+}$, and preferably $Mg^{2+}$, $Zn^{2+}$ or $Ni^{2+}$; $A^{n-}$ is one or more of $Cl^-$, $NO_3^-$, $SO_4^{2-}$ and $CO_3^{2-}$; x is a value of the molar ratio of $Al^{3+}/(M^{2+}+Al^{3+})$, and $0 \le x \le 1$; m is the number of moles of interlayer water molecules, and $0.5 \le m \le 4.5$; the trivalent metal ion $Al^{3+}$ is supplied from the $Al_2O_3$ carrier, and the LDHs is grown in situ on the alumina carrier.

In the formula (I), $Al_2O_3$ is used as the carrier, and suitable performance indicators thereof such as crystalline form, pore diameter, size, and specific surface area can be selected according to the actual needs of the target reaction. Generally, the crystalline form thereof is one or more of α, β, θ, γ and δ, and the carrier may have a shape which is spherical, bar-like, cylindrical, trefoil, honeycomb, or powder.

The invention provides a process for preparing a noble metal catalyst supported on alumina as the carrier, in which hexamethylenetetramine, a soluble divalent metal salt solution, a $Al_2O_3$ carrier and a soluble noble metal salt solution are mixed and crystallized. The hexamethylenetetramine is used as both the precipitating agent for producing hydrotalcite and the reducing agent for the noble metal precursor due to its the property of releasing ammonia and formaldehyde upon decomposition, and the supported catalyst Me-LDHs-$Al_2O_3$ containing an elementary substance of noble metal is prepared by one-step reaction. During the growth of the hydrotalcite, $Al^{3+}$ on the surface layer of the $Al_2O_3$ carrier is directly used as the trivalent metal ion in the formation of the slab structure, and the hydrotalcite is grown in situ on the surface of the alumina carrier.

Specifically, the invention provides a process for preparing in situ the supported noble metal catalyst comprising the steps of:
- A) dissolving a soluble noble metal salt precursor in a solvent to prepare a noble metal salt solution with a concentration of 0.004 to 0.01 mol/L, wherein the anion in the solution is $NO_3^-$, $Cl^-$, $CH_3COO^-$ or $C_5H_7O_2^-$ and the solvent may be deionized water, ethanol, or toluene; preferably, in this step, the soluble noble metal salt precursor is $Ru(NO)(NO_3)_3$, $Ru(NO_3)_3 \cdot 2H_2O$, $RuCl_3 \cdot 3H_2O$, $RhCl_3 \cdot 3H_2O$, $Rh(CH_3COO)_3$, $Rh(NO_3)_3$, $Pd(NH_3)_2Cl_2$, $Pd(NO_3)_2$, $Pd(C_5H_7O_2)_2$, $Na_2PdCl_4$, $Pd(CH_3COO)_2$, $H_2PtCl_6$, $Pt(NO_3)_2$, $[Pt(NH_3)_4]Cl_2$ or $Pt(C_5H_7O_2)_2$;
- B) dissolving a soluble divalent metal salt in deionized water to prepare a divalent metal salt solution with a concentration of 0.02 to 0.08 mol/L, wherein the divalent metal $M^{2+}$ is one or more of $Mg^{2+}$, $Zn^{2+}$, $Ni^{2+}$, $Co^{2+}$, $Cu^{2+}$ and $Mn^{2+}$, and preferably $Mg^{2+}$, $Zn^{2+}$ or $Ni^{2+}$, and the anion in the salt solution is one or more of $Cl^-$, $NO_3^-$, $SO_4^{2-}$ and $CO_3^{2-}$;
- C) adding hexamethylenetetramine to the divalent metal salt solution prepared in the step B), and stirring to reach a sufficient dissolution while the temperature of the solution is maintained at 0 to 10° C., followed by adding thereto the noble metal salt solution prepared in the step A) and stirring well to obtain a mixed solution, wherein the molar ratio of $M^{2+}$ to hexamethylenetetramine is 1:3 to 28, and preferably 1:3 to 10, and the molar ratio of the noble metal to $M^{2+}$ is 0.15 to 7.5:100, and preferably 0.15 to 1.5:100;
- D) adding a $Al_2O_3$ carrier to the mixed solution as above according to a theoretical supported amount of 0.01 to 5% of the noble metal Me on the $Al_2O_3$ carrier, subjecting the resultant mixture to crystallization for 1 to 6 hours at 130° C. to 180° C., discharging, washing the solid product with deionized water until the pH value of the washings becomes 7 to 8, and subsequently performing a drying step for 8 to 24 hours at 30° C. to 90° C., to obtain Me-LDHs-$Al_2O_3$.

In the process for preparing in situ the supported noble metal catalyst of the invention, the crystalline form of the $Al_2O_3$ carrier may be one or more of α, β, θ, γ and δ; and the shape thereof may be spherical, bar-like, cylindrical, trefoil, honeycomb, powder or the like, and suitable performance indicators thereof such as crystalline form, size, pore structure, and specific surface area can be selected according to the actual needs of the target reaction.

The supported noble metal catalyst obtained as the product according to the invention is gray or black, and is characterized by means of X-ray diffraction (XRD), scanning electron microscopy (SEM), X-ray photoelectron spectroscopy (XPS) and the like. The characteristic peaks of the hydrotalcite and the alumina carrier can be found in the XRD pattern. It is shown in the SEM micrographs that the hydrotalcite has a regular hexagonal layered structure and an intact crystalline form, and is evenly grown in situ on the surface of the alumina carrier; the noble metal particles have a small size and are in the shape of triangle, rhombus, pentagon and several irregular shapes and evenly dispersed on the slabs of the hydrotalcite. It is known from the results of XPS analysis that zero-valent noble metal particles having a catalytic activity are present in the catalyst.

The advantage of the invention is that it is the first time where hexamethylenetetramine is used as both the precipitating agent and the reducing agent to successfully prepare Me-LDHs-$Al_2O_3$ catalyst; during the crystallization, the noble metal is reduced from the noble metal in the precursor to an elementary substance $Me^0$ by formaldehyde released from the decomposition of hexamethylenetetramine; the steps of calcination and reduction in the conventional preparation method are no longer required and a reduced noble metal catalyst can be obtained by a single step, namely a crystallization process; the preparation method is simple and convenient, with almost no loss of the active ingredient in the raw materials and an improved utilization ratio of the noble metal. Based on the characteristics of the hydrotalcite such as a large specific surface area and a high degree of dispersion of the active component, the invention uses the alumina carrier as the aluminum source such that the hydrotalcite is grown in situ on the surface of the alumina, and the noble metal particles can be uniformly distributed with a small particle size on the surface of the hydrotalcite, thereby effectively improving the dispersion degree of the noble metal as the active component.

DETAILED DESCRIPTION OF THE INVENTION

Hereinafter, the techniques and characteristics of the invention will be described in detail by referring to specific examples, but it is not intended that the scope of the invention is limited to these examples.

Example 1

In Example 1, a supported noble metal catalyst was prepared in accordance with the following steps:

Step A) 0.0114 g of $Pd(NO_3)_2$ was weighed and dissolved in 10 mL of deionized water to prepare a precursor solution of Pd metal;

Step B) 1.67 g of $Mg(NO_3)_2 \cdot 6H_2O$ was weighed and dissolved in 90 mL of deionized water to prepare a metal salt solution;

Step C) 6.41 g of hexamethylenetetramine was weighed, and dissolved in the metal salt solution from the step B) under conditions of an ice bath such that the molar ratio of Mg to hexamethylenetetramine was 1/7; the solution was stirred under conditions of the ice bath until hexamethylenetetramine was completely dissolved, and then the $Pd(NO_3)_2$ solution prepared in the step A) was added thereto and stirred well;

Step D) 5 g of a spherical $\alpha$-$Al_2O_3$ carrier having an average diameter of 2.5 mm was added to the solution from the step C); the above mixture was transferred to a hydrothermal reactor, and crystallized for 6 hours at 130° C.; after being cooled to room temperature, the solid product was washed with deionized water until the pH value of the washings became 7, and was dried for 12 hours at 80° C., to obtain a noble metal catalyst Pd-LDHs-$Al_2O_3$ supported on alumina as the carrier of the present Example.

In the catalyst of the Example, the LDHs had a chemical formula which could be written as $[Mg^{2+}_{0.67}Al^{3+}_{0.33}(OH)_2]^{0.33+}(CO_3^{2-})_{0.165} \cdot H_2O$; the original spherical $\alpha$-$Al_2O_3$ carrier had a specific surface area of about 19 m$^2$/g, and the specific surface area after in situ growth of the hydrotalcite was about 25 m$^2$/g; the loss ratio of Pd metal was less than 5%, and the dispersion degree thereof was 72%.

Figure 1:
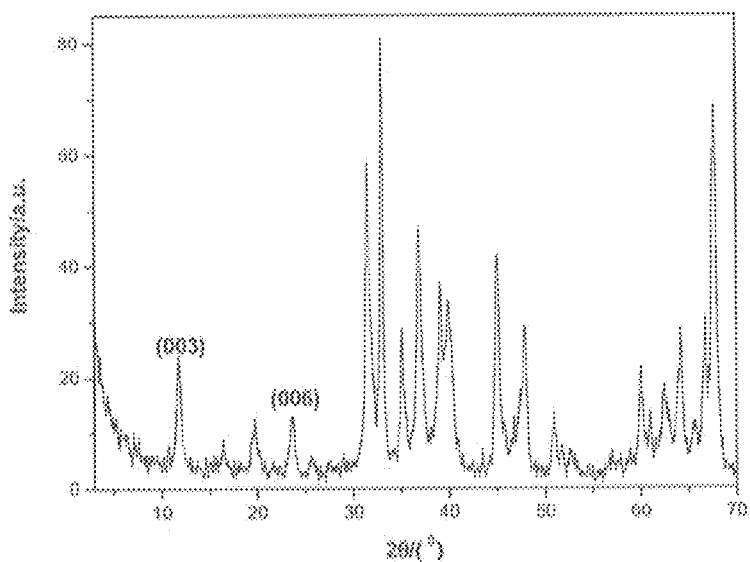
FIG. 1 is a XRD pattern of the Pd-LDHs-$Al_2O_3$ catalyst in Example 1.
Figure 2:
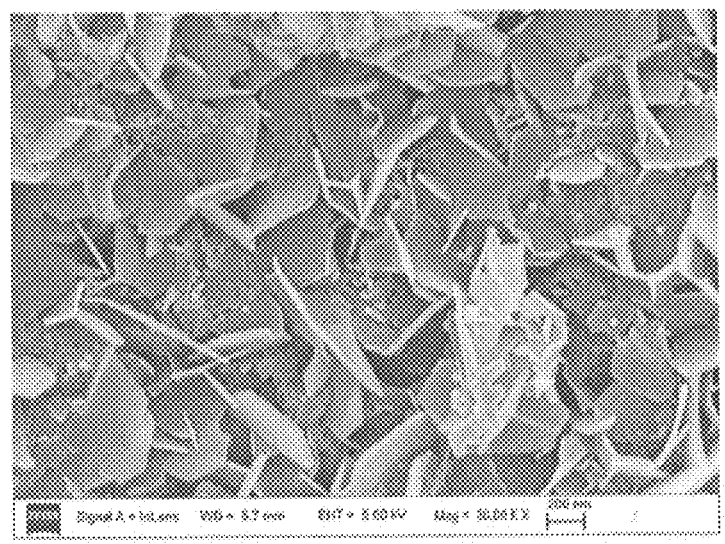
FIG. 2 is a SEM micrograph of the Pd-LDHs-$Al_2O_3$ catalyst in Example 1.
Figure 3:
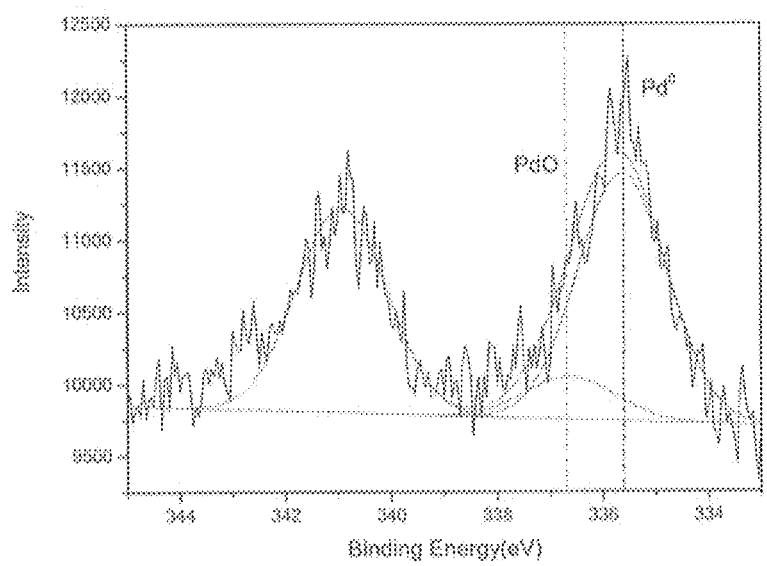
FIG. 3 is a XPS spectrum of the Pd-LDHs-$Al_2O_3$ catalyst in Example 1.

The XRD pattern, SEM micrograph and XPS spectrum of the catalyst of the Example are shown in FIGS. 1, 2 and 3, respectively. The characteristic peaks of the hydrotalcite crystal (003, 006) and the characteristic peaks of the alumina ($\alpha$-$Al_2O_3$ in the Example) can be found from FIG. 1. As shown in FIG. 2, the hydrotalcite having an intact crystal is grown in situ on the surface of the alumina carrier, and has a hexagonal shape and a size of about 1 micron; the Pd metal particles are in the shape of a triangle, rhombus, pentagon, hexagon and other irregular polygons, and have a size of about 30 to 60 nm. The results of XPS analysis in FIG. 3 show that in the Pd catalyst supported on alumina, the $3d_{2/5}$ state of Pd has a peak at 335.7 eV, indicating that the valence state of the noble metal particles is zero.

Example 2

In Example 2, a supported noble metal catalyst was prepared in accordance with the following steps:

Steps A) and B) were the same as those in Example 1;

Step C) 2.75 g of hexamethylenetetramine was weighed, and dissolved in the metal salt solution under conditions of an ice bath such that the molar ratio of Mg to hexamethylenetetramine was 1/3; the solution was stirred under conditions of the ice bath until hexamethylenetetramine was completely dissolved, and then the $Pd(NO_3)_2$ solution was added thereto and stirred well;

Step D) 5 g of a spherical $\alpha$-$Al_2O_3$ carrier having an average diameter of 5.0 mm was added to the solution from the step C); the above mixture was transferred to a hydrothermal reactor, and crystallized for 6 hours at 150° C.; after being cooled to room temperature, the solid product was washed with deionized water until the pH value of the washings became 7, and was dried for 12 hours at 80° C., to obtain a noble metal catalyst Pd-LDHs-$Al_2O_3$ supported on alumina as the carrier of the present Example.

In the catalyst of the Example, the LDHs had a chemical formula which could be written as $[Mg^{2+}_{0.67}Al^{3+}_{0.33}(OH)_2]^{0.33+}(CO_3^{2-})_{0.165} \cdot H_2O$; the original spherical $\alpha$-$Al_2O_3$ carrier had a specific surface area of about 12 m$^2$/g, and the specific surface area after in situ growth of the hydrotalcite was about 17 m$^2$/g; the loss ratio of Pd metal was less than 5%, and the dispersion degree thereof was 67%.

Example 3

In Example 3, a supported noble metal catalyst was prepared in accordance with the following steps:

Steps A) and B) were the same as those in Example 1;

Step C) 12.82 g of hexamethylenetetramine was weighed, and dissolved in the metal salt solution under conditions of an ice bath such that the molar ratio of Mg to hexamethylenetetramine was 1/14; the solution was stirred under conditions of the ice bath until hexamethylenetetramine was completely dissolved, and then the $Pd(NO_3)_2$ solution was added thereto and stirred well;

Step D) 5 g of a spherical $\gamma$-$Al_2O_3$ carrier having an average diameter of 5.0 mm was added to the solution from the step C); the above mixture was transferred to a hydrothermal reactor, and crystallized for 6 hours at 180° C.; after being cooled to room temperature, the solid product was washed with deionized water until the pH value of the washings became 7, and was dried for 12 hours at 80° C., to obtain a noble metal catalyst Pd-LDHs-$Al_2O_3$ supported on alumina as the carrier of the present Example.

In the catalyst of the Example, the LDHs had a chemical formula which could be written as $[Mg^{2+}_{0.67}Al^{3+}_{0.33}(OH)_2]^{0.33+}(CO_3^{2-})_{0.165} \cdot H_2O$; the spherical $\gamma$-$Al_2O_3$ carrier had an original specific surface area of about 182 m$^2$/g, and the specific surface area after in situ growth of the hydrotalcite was about 211 m$^2$/g; the loss ratio of Pd metal was less than 5%, and the dispersion degree thereof was 85%.

Example 4

In Example 4, a supported noble metal catalyst was prepared in accordance with the following steps:

Steps A) and B) were the same as those in Example 1;

Step C) 9.16 g of hexamethylenetetramine was weighed, and dissolved in the metal salt solution under conditions of an ice bath such that the molar ratio of Mg to hexamethylenetetramine was 1/10; the solution was stirred under conditions of the ice bath until hexamethylenetetramine was completely dissolved, and then the $Pd(NO_3)_2$ solution was added thereto and stirred well;

Step D) 5 g of a bar-shaped $\alpha$-$Al_2O_3$ carrier having an average length of 10 mm was added to the solution from the step C); the above mixture was transferred to a hydrothermal reactor, and crystallized for 4 hours at 130° C.; after being cooled to room temperature, the solid product was washed with deionized water until the pH value of the washings became 7, and was dried for 12 hours at 80° C., to obtain a noble metal catalyst Pd-LDHs-$Al_2O_3$ supported on alumina as the carrier of the present Example.

In the catalyst of the Example, the LDHs had a chemical formula which could be written as $[Mg^{2+}_{0.67}Al^{3+}_{0.33}$ $(OH)_2]^{0.33+}(CO_3^{2-})_{0.165}.H_2O$; the bar-shaped $\alpha$-$Al_2O_3$ carrier had an original specific surface area of about 9 $m^2/g$, and the specific surface area after in situ growth of the hydrotalcite was about 13 $m^2/g$; the loss ratio of Pd metal was less than 5%, and the dispersion degree thereof was 62%.

Figure 4:
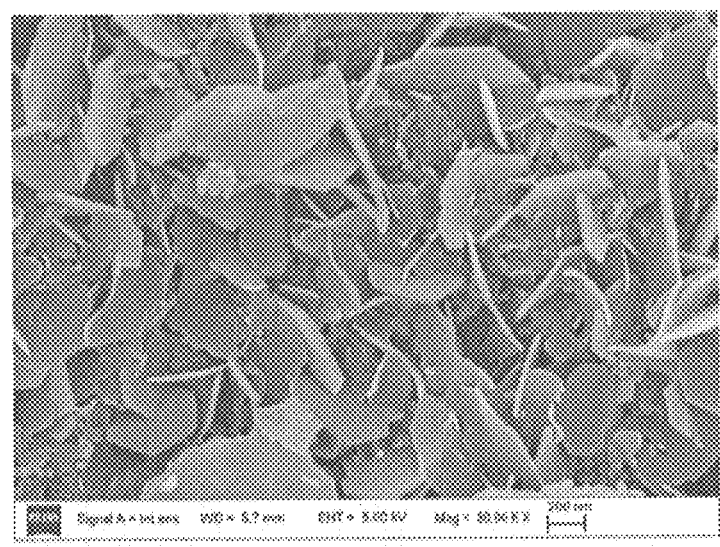
FIG. 4 is a SEM micrograph of the Pd-LDHs-$Al_2O_3$ catalyst in Example 4.
Figure 5:
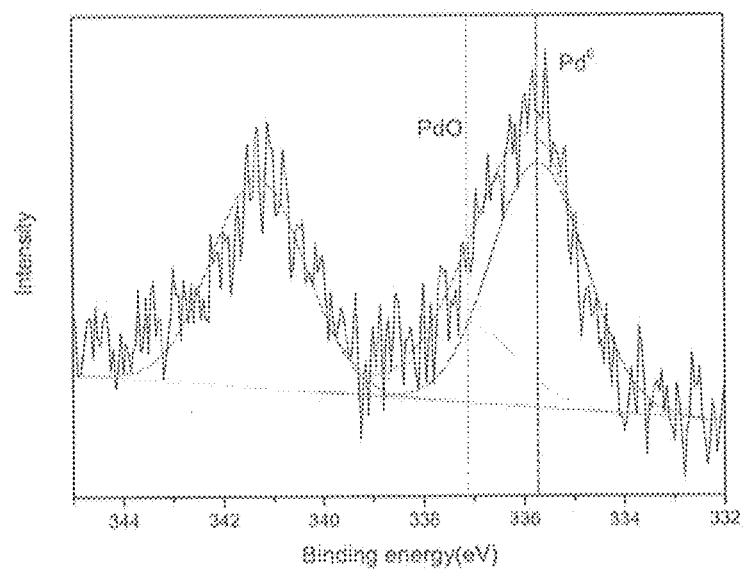
FIG. 5 is a XPS spectrum of the Pd-LDHs-$Al_2O_3$ catalyst in Example 4.

The SEM micrograph and XPS pattern of the catalyst of the Example are shown in FIGS. 4 and 5, respectively. As shown in FIG. 4, the hydrotalcite having an intact crystal is grown in situ on the surface of the alumina carrier, and has a hexagonal shape and a size of about 1 micron; the Pd metal particles are in the shape of triangles and several other shapes, and have a size of about 30 to 60 nm. The results of XPS analysis in FIG. 5 show that in the Pd catalyst supported on alumina, the $3d_{2/5}$ state of Pd has a peak at 335.7 eV, indicating that the valence state of the noble metal particles is zero.

Example 5

In Example 5, a supported noble metal catalyst was prepared in accordance with the following steps:
Step A) 0.0228 g of $Pd(NO_3)_2$ was weighed and dissolved in 10 mL of deionized water to prepare a precursor solution of Pd metal;
Step B) 1.32 g of $MgCl_2.6H_2O$ was weighed and dissolved in 90 mL of deionized water to prepare a metal salt solution;
Step C) and D) were the same as those in Example 1.

In the catalyst of the Example, the LDHs had a chemical formula which could be written as $[Mg^{2+}_{0.67}Al^{3+}_{0.33}(OH)_2]^{0.33+}(CO_3^{2-})_{0.165}.H_2O$; the original spherical $\alpha$-$Al_2O_3$ carrier had a specific surface area of about 19 $m^2/g$, and the specific surface area after in situ growth of the hydrotalcite was about 25 $m^2/g$; the loss ratio of Pd metal was less than 5%, and the dispersion degree thereof was 65%.

Example 6

In Example 6, a supported noble metal catalyst was prepared in accordance with the following steps:
Step A) 0.0114 g of $Pd(NO_3)_2$ was weighed and dissolved in 10 mL of deionized water to prepare a precursor solution of Pd metal;
Step B) 1.89 g of $Ni(NO_3)_2.6H_2O$ was weighed and dissolved in 90 mL of deionized water to prepare a metal salt solution;
Step C) and D) were the same as those in Example 1.

In the catalyst of the Example, the LDHs had a chemical formula which could be written as $[Ni^{2+}_{0.75}Al^{3+}_{0.25}(OH)_2]^{0.25+}(CO_3^{2-})_{0.125}.H_2O$; the original spherical $\alpha$-$Al_2O_3$ carrier had a specific surface area of about 19 $m^2/g$, and the specific surface area after in situ growth of the hydrotalcite was about 25 $m^2/g$; the loss ratio of Pd metal was less than 5%, and the dispersion degree thereof was 69%.

Example 7

In Example 7, a supported noble metal catalyst was prepared in accordance with the following steps:
Step A) 0.0058 g of NaCl and 0.0088 g of $PdCl_2$ were weighed in a molar ratio of 2:1, and dissolved in 10 mL of deionized water to prepare a solution of $Na_2PdCl_4$ as the Pd metal precursor;
Step B) 1.32 g of $MgCl_2.6H_2O$ was weighed and dissolved in 90 mL of deionized water to prepare a metal salt solution;
Step C) 9.16 g of hexamethylenetetramine was weighed, and dissolved in the metal salt solution under conditions of an ice bath such that the molar ratio of Mg to hexamethylenetetramine was 1/10; the solution was stirred under conditions of the ice bath until hexamethylenetetramine was completely dissolved, and then the $Na_2PdCl_4$ solution was added thereto and stirred well;
Step D) 5 g of a bar-shaped $\gamma$-$Al_2O_3$ carrier having an average length of 10 mm was added to the solution from the step C); the above mixture was transferred to a hydrothermal reactor, and crystallized for 2 hours at 180° C.; after being cooled to room temperature, the solid product was washed with deionized water until the pH value of the washings became 7, and was dried for 12 hours at 80° C., to obtain a noble metal catalyst Pd-LDHs-$Al_2O_3$ supported on alumina as the carrier of the present Example.

In the catalyst of the Example, the LDHs had a chemical formula which could be written as $[Mg^{2+}_{0.67}Al^{3+}_{0.33}(OH)_2]^{0.33+}(CO_3^{2-})_{0.165}.H_2O$; the bar-shaped $\gamma$-$Al_2O_3$ carrier had an original specific surface area of about 159 $m^2/g$, and the specific surface area after in situ growth of the hydrotalcite was about 187 $m^2/g$; the loss ratio of Pd metal was less than 5%, and the dispersion degree thereof was 80%.

Example 8

In Example 8, a supported noble metal catalyst was prepared in accordance with the following steps:
Step A) 0.0159 g of $Pt(C_5H_7O_2)_2$ was weighed and dissolved in 10 mL of ethanol to prepare a precursor solution of Pt metal;
Step B) 1.87 g of $ZnSO_4.7H_2O$ was weighed and dissolved in 90 mL of deionized water to prepare a metal salt solution;
Step C) 9.16 g of hexamethylenetetramine was weighed, and dissolved in the metal salt solution under conditions of an ice bath such that the molar ratio of Zn to hexamethylenetetramine was 1/10; the solution was stirred under conditions of the ice bath until hexamethylenetetramine was completely dissolved, and then the Pt metal precursor solution prepared in the step A) was added thereto and stirred well;
Step D) 5 g of $Al_2O_3$ carrier having $\alpha,\gamma$-mixed crystalline form and an average diameter of 5 mm was added to the solution from the step C); the above mixture was transferred to a hydrothermal reactor, and crystallized for 4 hours at 150° C.; after being cooled to room temperature, the solid product was washed with deionized water until the pH value of the washings became 7, and was dried for 12 hours at 80° C., to obtain a noble metal catalyst Pt-LDHs-$Al_2O_3$ supported on alumina as the carrier of the present Example.

In the catalyst of the Example, the LDHs had a chemical formula which could be written as $[Zn^{2+}_{0.67}Al^{3+}_{0.33}(OH)_2]^{0.33+}(CO_3^{2-})_{0.165}.H_2O$; the original carrier had a specific surface area of about 109 $m^2/g$, and the specific surface area after in situ growth of the hydrotalcite was about 125 $m^2/g$; the loss ratio of Pt metal was less than 5%, and the dispersion degree thereof was 78%.

Example 9

In Example 9, a supported noble metal catalyst was prepared in accordance with the following steps:
Step A) 0.0130 g of $RuCl_3.3H_2O$ was weighed and dissolved in 10 mL of deionized water to prepare a Ru precursor solution;

Step B) 1.93 g of Zn(NO$_3$)$_2$.6H$_2$O was weighed and dissolved in 90 mL of deionized water to prepare a metal salt solution;

Step C) 6.41 g of hexamethylenetetramine was weighed, and dissolved in the metal salt solution under conditions of an ice bath such that the molar ratio of Zn to hexamethylenetetramine was 1/7; the solution was stirred under conditions of the ice bath until hexamethylenetetramine was completely dissolved, and then the precursor solution of Ru metal prepared in the step A) was added thereto and stirred well;

Step D) was the same as that in Example 1.

In the catalyst of the Example, the LDHs had a chemical formula which could be written as $[Zn^{2+}_{0.67}Al^{3+}_{0.33}(OH)_2]^{0.33+}(CO_3^{2-})_{0.165} \cdot H_2O$; the original spherical α-Al$_2$O$_3$ carrier had a specific surface area of about 19 m$^2$/g, and the specific surface area after in situ growth of the hydrotalcite was about 25 m$^2$/g; the loss ratio of Ru metal was less than 5%, and the dispersion degree thereof was 72%.

Example 10

In Example 10, a supported noble metal catalyst was prepared in accordance with the following steps:

Step A) 0.0143 g of Rh(NO$_3$)$_3$ was weighed and dissolved in 10 mL of deionized water to prepare a Rh precursor solution;

Step B) 0.84 g of Mg(NO$_3$)$_2$.6H$_2$O and 0.97 g of Zn(NO$_3$)$_2$.6H$_2$O were weighed in a molar ratio of 1:1, and dissolved in 90 mL of deionized water to prepare a mixed metal salt solution;

Step C) 9.16 g of hexamethylenetetramine was weighed, and dissolved in the mixed metal salt solution prepared in the step B) under conditions of an ice bath such that the molar ratio of Mg, Zn and hexamethylenetetramine was 1/1/20; the solution was stirred under conditions of the ice bath until hexamethylenetetramine was completely dissolved, and then the precursor solution of Rh metal prepared in the step A) was added thereto and stirred well;

Step D) was the same as that in Example 1.

In the catalyst of the Example, the LDHs had a chemical formula which could be written as $[Mg^{2+}_{0.33}Zn^{2+}_{0.33}Al^{3+}_{0.33}(OH)_2]^{0.33+}(CO_3^{2-})_{0.165} \cdot H_2O$; the original spherical α-Al$_2$O$_3$ carrier had a specific surface area of about 19 m$^2$/g, and the specific surface area after in situ growth of the hydrotalcite was about 25 m$^2$/g; the loss ratio of Rh metal was less than 5%, and the dispersion degree thereof was 73%.

What is claimed is:

1. A process for preparing in situ a supported noble metal catalyst having a composition represented by the general formula:

Me-LDHs-Al$_2$O$_3$      (I)

wherein Me is a noble metal as the active component of the catalyst, and is Ru, Rh, Pd or Pt, the noble metal element particle in the catalyst has a particle size of 10 to 60 nm, with an even and stable dispersion on or between slabs of hydrotalcite (LDHs), and the hydrotalcite is grown in situ on the surface of an Al$_2$O$_3$ carrier, the process consisting of the steps of:

A) dissolving a soluble noble metal salt precursor in a solvent to prepare a noble metal salt solution with a concentration of 0.004 to 0.01 mol/L, wherein the anion in the solution is NO$_3^-$, Cl$^-$, CH$_3$COO$^-$ or C$_5$H$_7$O$_2^-$ and the solvent is deionized water, ethanol, or toluene;

B) dissolving a soluble divalent metal salt in deionized water to prepare a divalent metal salt solution in a concentration of 0.02 to 0.08 mol/L, wherein the divalent metal M$^{2+}$ is one or more of Mg$^{2+}$, Zn$^{2+}$, Ni$^{2+}$, Co$^{2+}$, Cu$^{2+}$ and Mn$^{2+}$, and the anion in the salt solution is one or more of Cl$^-$, NO$_3^-$, SO$_4^{2-}$ and CO$_3^{2-}$;

C) adding hexamethylenetetramine to the divalent metal salt solution prepared in the step B), and stirring to reach a sufficient dissolution while the temperature of the solution is maintained at 0 to 10° C., followed by adding thereto the noble metal salt solution prepared in the step A) and stirring well to obtain a mixed solution, wherein the molar ratio of M$^{2+}$ to hexamethylenetetramine is 1:3 to 1:28, and the molar ratio of the noble metal to M$^{2+}$ is 0.15:100 to 7.5:100;

D) adding the Al$_2$O$_3$ carrier to the mixed solution as above according to a theoretcial supported amount of 0.01 to 5% of the noble metal Me on the Al$_2$O$_3$ carrier, subjecting the resulting material to crystallization for 1 to 6 hours at 130° C. to 180° C., discharging, washing the solid product with deionized water until the pH value of the washings becomes 7 to 8, and subsequently performing a drying for 8 to 24 hours at 30° C. to 90° C., to obtain Me-LDHs-Al$_2$O$_3$.

2. The process for preparing in situ the supported noble metal catalyst according to claim 1, wherein in the step A), the soluble noble metal salt precursor is Ru(NO)(NO$_3$)$_3$, Ru(NO$_3$)$_3$.2H$_2$O, RuCl$_3$.3H$_2$O, RhCl$_3$.3H$_2$O, Rh(CH$_3$COO)$_3$, Rh(NO$_3$)$_3$, Pd(NH$_3$)$_2$Cl$_2$, Pd(NO$_3$)$_2$, Pd(C$_5$H$_7$O$_2$)$_2$, Na$_2$PdCl$_4$, Pd(CH$_3$COO)$_2$, H$_2$PtCl$_6$, Pt(NO$_3$)$_2$, [Pt(NH$_3$)$_4$]Cl$_2$ or Pt(C$_5$H$_7$O$_2$)$_2$.

3. The process for preparing in situ the supported noble metal catalyst according to claim 1, wherein in the step B), the divalent metal M$^{2+}$ is Mg$^{2+}$, Zn$^{2+}$ or Ni$^{2+}$.

4. The process for preparing in situ the supported noble metal catalyst according to claim 1, wherein in the mixed solution in the step C), the molar ratio of M$^{2+}$ to hexamethylenetetramine is 1:3 to 1:10, and the molar ratio of the noble metal to M$^{2+}$ is 0.15:100 to 1.5:100.

5. The process for preparing in situ the supported noble metal catalyst according to claim 1, wherein in the step D), the crystalline form of the Al$_2$O$_3$ carrier is one or more of α, η, γ and δ, and the carrier has a shape which is spherical, bar-like, cylindrical, trefoil, honeycomb, or powder.

* * * * *